United States Patent [19]

Hecke

[11] Patent Number: 5,141,350
[45] Date of Patent: Aug. 25, 1992

[54] PRESSURIZED DRIVE COUPLING

[75] Inventor: Franz-Josef Hecke, Rheine, Fed. Rep. of Germany

[73] Assignee: Renk Tacke GmbH, Augsburg, Fed. Rep. of Germany

[21] Appl. No.: 619,253

[22] Filed: Nov. 28, 1990

[30] Foreign Application Priority Data

Nov. 30, 1989 [DE] Fed. Rep. of Germany ....... 3939600

[51] Int. Cl.⁵ .................... F16B 2/04; F16D 9/00
[52] U.S. Cl. ...................... 403/15; 403/301; 403/383; 464/32; 464/182
[58] Field of Search ............. 403/34, 36–38, 403/383, 15, 301; 464/182, 158, 159, 30, 32

[56] References Cited

U.S. PATENT DOCUMENTS

| | | | |
|---|---|---|---|
| 2,885,231 | 5/1959 | Smith . | |
| 3,673,816 | 7/1972 | Kuszaj | 464/182 X |
| 3,779,037 | 12/1973 | Petros et al. | 403/301 X |
| 3,805,374 | 4/1974 | Carman | 464/182 X |
| 4,264,229 | 4/1981 | Falk | 403/15 |
| 4,525,916 | 7/1985 | Wuhrer | 403/15 X |
| 4,752,275 | 6/1988 | Lindenthal et al. | 464/32 |
| 4,859,106 | 8/1989 | Elsner et al. | 403/15 X |

FOREIGN PATENT DOCUMENTS

| | | |
|---|---|---|
| 0386744 | 9/1990 | European Pat. Off. . |
| 2403337 | 8/1974 | Fed. Rep. of Germany . |
| 2362408 | 6/1975 | Fed. Rep. of Germany . |
| 2659547 | 7/1978 | Fed. Rep. of Germany . |
| 3433635 | 3/1986 | Fed. Rep. of Germany . |
| 3543672 | 6/1987 | Fed. Rep. of Germany . |
| 3545651 | 7/1987 | Fed. Rep. of Germany . |
| 3638596 | 5/1988 | Fed. Rep. of Germany . |
| 826595 | 9/1937 | France . |
| 826936 | 9/1937 | France . |
| 2215554 | 8/1974 | France . |
| 870927 | 6/1961 | United Kingdom . |
| 2023250 | 12/1979 | United Kingdom . |

OTHER PUBLICATIONS

*Safeset Safety Couplings*, by Renk Tacke, Published Apr. 1988.

*Primary Examiner*—Peter M. Cuomo
*Attorney, Agent, or Firm*—Natter & Natter

[57] ABSTRACT

A pressurized drive coupling includes a socket joined to an end of one shaft in a drive system and a stem extending from an end of another shaft. The stem is insertable into a cavity formed in the socket and the stem and cavity have mating noncircular transverse cross-sections. A sleeve is seated around the socket. The sleeve includes a rigid outer section and a deformable inner section which is in contact with the socket. A pressure chamber is formed between the sections of the sleeve and the pressure chamber is filled with a suitable fluid which is pressurized to reduce the dimensions of the cavity and eliminate clearance between the stem and cavity.

8 Claims, 1 Drawing Sheet

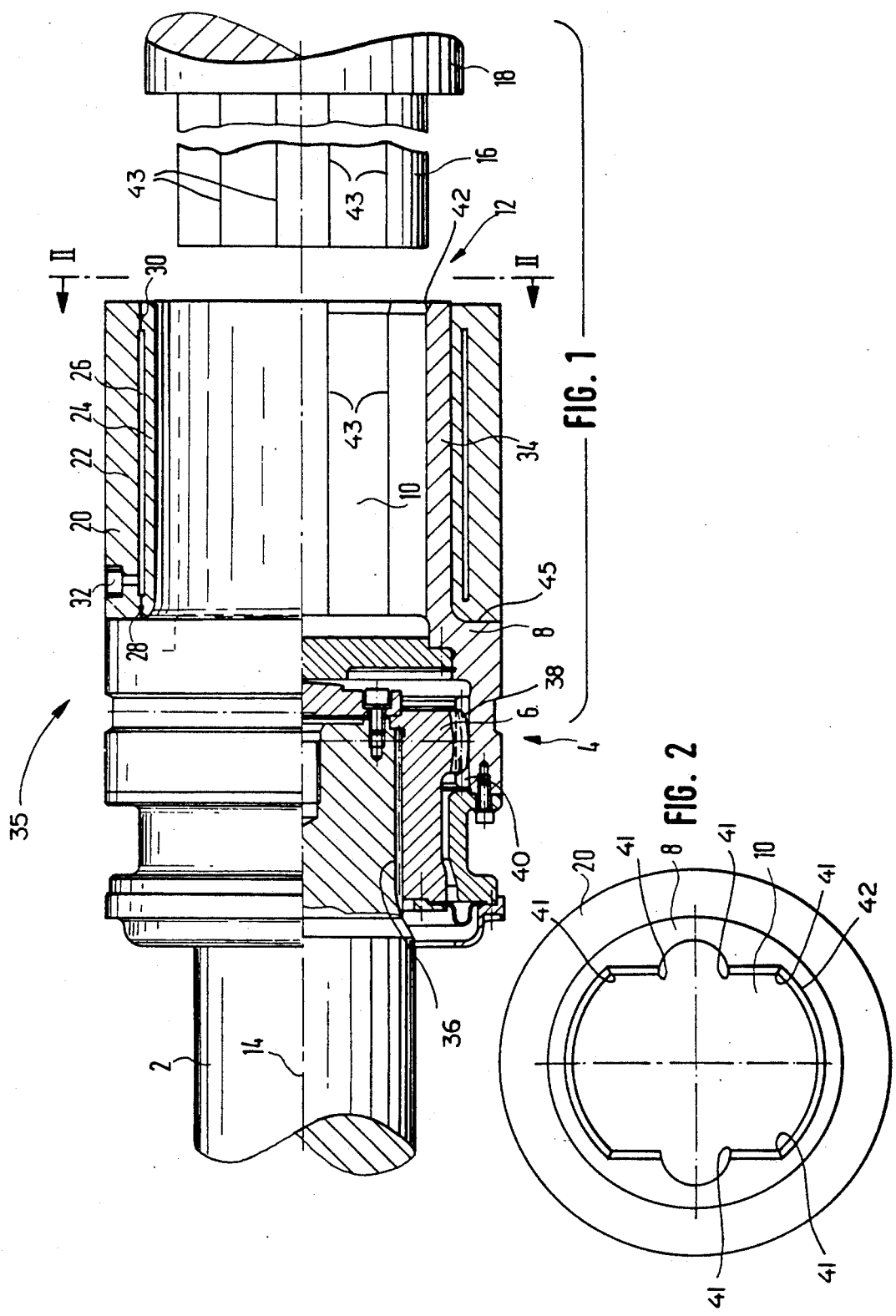

PRESSURIZED DRIVE COUPLING

BACKGROUND OF THE INVENTION

1. Field of the Invention

This invention relates generally to couplings for joining rotating shafts in a drive system and more particularly to couplings with intermitting male and female components.

2. Related History

Couplings with interfitting male and female components for interconnecting rotating shafts in drive systems have been commonly used. Such couplings included a stem which projected from one of the shafts. The stem was seated in a bore of a sleeve attached to the end of the other shaft. Both the stem and the bore were of noncircular transverse cross-section so that the stem could not rotate relative to the bore.

In order to facilitate insertion and removal of the stem, the dimensions of the bore were slightly larger than those of the stem. The clearance between the bore and the stem was accompanied with certain drawbacks, however. Because of such clearance, the stem and its associated shaft did not rotate on the same axis as the bore and wobble as well as rotational play was introduced at the coupling. The wobble led to wear in the coupling itself and increased the play between the components. Coupling play in drive systems, such as, a motor drive system in a compression roller at a rolling mill, was highly undesirable. Such drive systems were exposed to intense torque shocks and coupling play and wobble resulted in accelerated wear of the entire drive system.

Attempts to reduce or eliminate play between the stem and the bore rendered assembly and the disassembly of the coupling a difficult task, since the coupling components were required to be force fitted together.

In German patent documents DE 35 43 672 and DE 35 45 651(U.S. Pat. No. 4,752,275), cylindrical shafts were interconnected to cylindrical bores in drive systems through the employment of a pressure union which comprised a bushing positioned between the shaft and the bore. Such unions required the application of large compressive forces which were necessary to prevent rotation between the components. Those unions were suited for employment in torque limiting applications since torque loads which exceeded a maximum torque resulted in slip with the torque limit dependent upon the applied pressure and other factors.

SUMMARY OF THE INVENTION

Two shafts in a drive system are nonrotatably joined by a pressurized drive coupling. The drive coupling includes a socket connected to an end of one of the shafts and a stem projecting from an end of the other shaft. A cavity in the socket is shaped to receive the stem.

Both the stem and the cavity ar configured with noncircular transverse cross-section to preclude rotation relative to one another. Preferably, the periphery of the stem and the inner periphery of the cavity include a plurality of multiple edges formed by intersecting surfaces and extending in an axial direction.

The cavity is dimensioned slightly larger than the stem to permit interference free insertion and removal of the stem. In order to assure a tight fit, after the stem has been inserted into the cavity, a hollow sleeve which is positioned around the socket is pressurized to compress the socket inwardly against the stem.

From the foregoing compendium, it will be appreciated that it is an aspect of the present invention to provide a pressurized drive coupling of the general character described which is not subject to the disadvantages of the related history aforementioned.

It is a feature of the present invention to provide a pressurized drive coupling of the general character described which renders the coupling and uncoupling of shafts in a drive system a simple task.

A consideration of the present invention is to provide a pressurized drive coupling of the general character described which is relatively low in cost.

Another feature of the present invention is to provide a pressurized drive coupling of the general character described which is capable of transmitting high torque loads while employing relatively low pressures as compared with pressure unions previously known.

To provide a pressurized drive coupling of the general character described which is well suited for low cost mass production fabrication is a further consideration of the present invention.

Yet another aspect of the present invention is to provide a pressurized drive coupling of the general character described which provides coaxial unitary movement of coupling components as would be normally associated with an interference fit between components.

A still further feature of the present invention is to provide a pressurized drive coupling of the general character described wherein pressure is utilized to remove clearance between interfitting components by radial compression of one component against the other.

Other aspects, features and considerations of the present invention in part will be obvious and in part will be pointed out hereinafter.

With these ends in view, the invention finds embodiment in certain combinations of elements, arrangements of parts and series of steps by which the said aspects, features and considerations aforementioned and certain other aspects, features and considerations are attained, all with reference to the accompanying drawings and the scope of which is more particularly pointed out and indicated in the appended claims.

BRIEF DESCRIPTION OF THE DRAWINGS

In the accompanying drawings, in which is shown one of the various possible exemplary embodiments of the invention, FIG. 1 is a fragmentary, sectional, elevational view of a pressurized drive coupling constructed in accordance with the invention and including a socket and a stem and showing a pair shafts axially aligned but uncoupled and with one of the shafts having the socket joined to its end and the other shaft including the stem;

FIG. 2 is an auxiliary end view of the socket, the same being taken substantially along the II—II of FIG. 1 and illustrating a sleeve circumscribing the socket.

DESCRIPTION OF THE PREFERRED EMBODIMENT

Referring now in detail to the drawings, the reference numeral 35 denotes generally a pressurized drive coupling constructed in accordance with and embodying the invention. The coupling 35 is configured for nonrotatably coupling a first shaft 2 and a second shaft 18 for unitary rotation in a drive system. The coupling 35 includes a socket 8 mounted at an end 4 of the shaft 2.

Interconnecting the shaft 2 and the socket 8, is a ring gear 6. The ring gear 6 includes internal teeth 36 in engagement with teeth formed on the shaft 2 and external teeth 38 in engagement with internal teeth 40 provided in the socket 8. Preferably, the socket 8 and the shaft 2 lie in a common axis 14, however, the ring gear teeth 38 may be curved in axial profile to provide an articulated joint and permit limited movement. The opposite end of the shaft 2 may also include a coupling with a ring gear having a curved axial tooth profile for articulate movement.

In accordance with the invention, the socket 8 is provided with an axial cavity 10 having an open end 12 and a noncircular transverse cross-section defined by the interior faces of a socket wall 34. Although the cavity 10 is noncircular, the periphery of the socket wall 34 is preferably cylindrical.

Mounted to or integral with an end of the second shaft 18, is a stem 16. The stem 16 is configured with a noncircular axial transverse cross-section mating with that of the cavity 10. It should be apparent that when the stem 16 is seated in the cavity 10, the stem and socket are lockingly engaged for substantially unitary rotation and torque transmission, thus interconnecting the shafts 2 and 18 for unitary rotation.

Locking engagement between the cavity 10 and the stem 16 is effected by the mating noncircular transverse cross-sections. The cross-sections preferably include a plurality of corners 41 which are formed by axial longitudinal edges 43 of intersecting surfaces which extend axially along the length of the stem and the cavity. As illustrated in FIG. 1, throughout the axial length of each surface of the cavity 10 and the stem 16, each surface is parallel to the common longitudinal axis 14 of the cavity and the stem. Thus, any transverse cross-section of the cavity 10 will be congruent with any other transverse cross-section and any transverse cross-section of the stem will be congruent with any other transverse cross-section.

In order to facilitate insertion of the stem 16 into the cavity 10, the cavity 10 is dimensioned slightly larger than the stem. For example, a circumferential clearance of 0.1 mm may be provided. In addition, insertion of the stem 16 into the cavity 10 is also facilitated by providing an outwardly flared chamfer 42 at the open end 12 of the socket 8.

Pursuant to the invention, the clearance provided to facilitate insertion and removal of the stem 16 may be eliminated, thus removing play and wobble within the coupling 35 and assuring that the socket 8 and stem 16 remain coaxial regardless of varying loads and torque shocks. A sleeve 20 is seated in contact with the cylindrical periphery of the socket wall 34 with an end of the sleeve 20 abutted against a shoulder 45 of the socket.

The sleeve 20 includes a relatively thick walled cylindrical outer section 22 which is of sufficient strength of withstand radial deflection in the presence of pressure necessary to remove the clearance. An inner cylindrical section 24 is also provided. The inner section 24 is relatively deformable in a radial direction in the presence of applied pressure. Preferably, both the outer and inner cylindrical sections 22, 24 are fabricated of the same material, for example, iron or steel having the appropriate strength required for each designated application. The outer and inner cylindrical sections 22, 24 are integrally connected at both ends of the sleeve 20 by, for example, a continuous weld 28 at one end of the sleeve and a continuous weld 30 at the other end. A sealed hollow space or pressure chamber 26 is provided between the outer section 22 and the inner section 24 and between the opposite ends of the sleeve 20.

The pressure chamber 26 is accessed through a valve 32 which is seated in a radial bore extending through the outer section. The pressure chamber 26 is filled with a suitable fluid such as a hydraulic oil and pressurized to the extent necessary to deflect the inner section 24 and the wall 34 of the socket 8 radially inwardly to reduce the internal dimensions of the cavity 10 and eliminate the clearance between the cavity 10 and the stem 16. In lieu of hydraulic oil, an alternate liquid or even a gas may be used to fill and pressurize the chamber 26.

The socket wall 34 is deflected inwardly until contact is provided between the cavity 10 and the stem 16. Since the cavity 10 and the stem 16 are noncircular, the extent of pressurization necessary to remove the clearance is substantially less than that which would be required to prevent rotation between interfitting components of circular transverse cross-section.

Since the radial forces which deflect the wall 34 inwardly must be balanced by radially outwardly directed forces, the relatively thick wall of the outer section 22 is configured with a thickness and strength sufficient to withstand such forces without significant deflection.

Thus, it will be seen that there is provided a pressurized drive coupling which achieves the various aspects, features and considerations of the present invention and which is well adapted to meet the conditions of practical usage.

Since various possible embodiments might be made of the present invention and since various changes might be made in the exemplary embodiment shown herein, it is to be understood that all matter herein described or shown in the accompanying drawings is to be interpreted as illustrative and not in a limiting sense.

Having thus described the invention, there is claimed as new and desired to be secured by Letters Patent:

1. A coupling for joining rotating shafts in a drive system, the coupling including a socket, means for joining the socket to an end of one shaft, the coupling further including a stem, the stem extending from the end of another shaft, the stem having a longitudinal axis, the stem being defined by a plurality of surfaces, each surface extending parallel to the longitudinal axis of the stem, the stem including a noncircular transverse cross-section which is uniform substantially cavity having length of the stem, and the socket including an axial throughout the axial a longitudinal axis, the cavity being defined by a plurality of surfaces, each surface extending parallel to the longitudinal axis of the cavity, the cavity having a mating noncircular transverse cross-section which is uniform substantially throughout the axial length of the cavity, the transverse cross-section of the cavity being slightly larger than the transverse cross-section of the stem to provide clearance for facilitating the insertion of the stem into the cavity and removal of the stem from the cavity, the surfaces of the stem directly engaging the surfaces of the cavity to lock the stem and the socket and their respective shafts, the coupling further including a sleeve positioned on the socket and registered with the cavity, the sleeve including a relatively rigid outer section, a relatively flexible inner section and a hollow pressure chamber positioned between the sections, the coupling further including means for introducing a pressurized fluid into the pressure chamber to exert radially inward forces deflecting the socket to move the surfaces of the cavity inwardly toward the surfaces of the stem whereby play between the socket and the stem is eliminated to provide wobble free torque transmission through the coupling.

2. A coupling for joining rotating shafts as constructed in accordance with claim 1, wherein the mating noncircular transverse cross-sections of the cavity and the stem include a plurality of corners.

3. A coupling for joining rotating shafts as constructed in accordance with claim 1, wherein the periphery of the socket in registration with the cavity is substantially cylindrical, the inner section of the sleeve being cylindrical and the outer section of the sleeve being cylindrical.

4. A coupling for joining rotating shafts as constructed in accordance with claim 1, wherein the means for introducing a pressurized fluid into the chamber includes a nonfrangible valve, the nonfrangible valve being positioned in the outer section of the sleeve.

5. A coupling for joining rotating shafts in a drive system as constructed in accordance with claim 1, wherein the means for joining the socket to the end of the one shaft includes means for providing an articulated joint.

6. A coupling for joining rotating shafts as constructed in accordance with claim 5, wherein the means for providing an articulated joint includes a ring gear, means nonrotatably coupling the ring gear to one shaft, the ring gear including teeth in engagement with the socket, the teeth having a curved axial profile.

7. A coupling for joining rotating shafts in a drive system, the coupling including a socket, means for joining the socket to an end of one shaft in the drive system, the coupling further including a stem, the stem extending from another shaft in the drive system, the stem being formed of one piece unitary construction and having a longitudinal axis and a noncircular transverse cross-section, the transverse cross-section being uniform substantially throughout the axial length of the stem and the socket including an axial cavity, the cavity having a longitudinal axis and a mating noncircular transverse cross-section, the cavity transverse cross-section being uniform substantially throughout the axial length of the cavity, the cavity being formed of one piece unitary construction, the transverse cross-section of the cavity being slightly larger than the transverse cross-section of the stem to provide clearance for insertion of the stem into the cavity and removal of the stem from the cavity, the mating noncircular transverse cross-sections of the stem and the cavity serving to lock the stem and the socket and their respective shafts, a sleeve positioned on the socket and registered with the cavity, the sleeve including a relatively rigid outer section and means forming a hollow pressure chamber radially inwardly of the outer section, the coupling further including means for pressurizing the chamber with a fluid to exert radially inward forces of a pressure sufficient to deflect the socket to reduce the dimensions of the cavity and eliminate the clearance between the cavity and the stem, whereby play between the socket and the stem may be eliminated to provide coaxial wobble free torque transmission through the coupling.

8. A method of joining rotating shafts of a drive system in slip free interengagement, the method comprising the steps of:
 (a) providing a coupling, the coupling including a socket and a stem, the socket having a cavity of one piece unitary transverse cross-section, the cavity having a longitudinal axis and a noncircular transverse cross-section, the transverse cross-section of the cavity being uniform substantially throughout the axial length of the cavity, the stem having a longitudinal axis and a mating noncircular cross-section, the stem cross-section being uniform substantially throughout the axial length of the stem;
 (b) connecting the socket to one shaft of the drive system;
 (c) extending the stem from another shaft of the drive system;
 (d) locking the shafts in slip free interengagement by registering the mating noncircular cross-sections of the cavity and the stem and axially moving the socket and the stem relative to one another to insert and seat the stem within the cavity; and
 (e) positioning a sleeve having a pressure chamber around the socket and pressurizing the chamber with a fluid to a pressure sufficient to reduce the cross-section of the cavity to that of the stem and maintaining such pressure during rotation of the shafts.

* * * * *